US009652088B2

(12) United States Patent  
Harley

(10) Patent No.: US 9,652,088 B2  
(45) Date of Patent: May 16, 2017

(54) FABRICATION OF TOUCH SENSOR PANEL USING LASER ABLATION

(75) Inventor: Jonah A. Harley, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 885 days.

(21) Appl. No.: 12/847,987

(22) Filed: Jul. 30, 2010

(65) Prior Publication Data

US 2012/0026099 A1 Feb. 2, 2012

(51) Int. Cl.
*B05D 3/06* (2006.01)
*G06F 3/044* (2006.01)

(52) U.S. Cl.
CPC .... *G06F 3/044* (2013.01); *G06F 2203/04111* (2013.01)

(58) Field of Classification Search
CPC ............ B05D 5/12; G06F 3/044; G06F 3/041
USPC ................ 219/121.6; 427/554, 555; 345/173
See application file for complete search history.

(56) References Cited

U.S. PATENT DOCUMENTS

| | | |
|---|---|---|
| 4,087,625 A | 5/1978 | Dym et al. |
| 4,090,092 A | 5/1978 | Serrano |
| 4,304,976 A | 12/1981 | Gottbreht et al. |
| 4,475,235 A | 10/1984 | Graham |
| 4,659,874 A | 4/1987 | Landmeier |
| 5,194,862 A | 3/1993 | Edwards |
| 5,317,919 A | 6/1994 | Awtrey |
| 5,459,463 A | 10/1995 | Gruaz et al. |
| 5,483,261 A | 1/1996 | Yasutake |
| 5,488,204 A | 1/1996 | Mead et al. |
| 5,825,352 A | 10/1998 | Bisset et al. |
| 5,835,079 A | 11/1998 | Shieh |
| 5,841,078 A | 11/1998 | Miller et al. |
| 5,844,506 A | 12/1998 | Binstead |
| 5,880,411 A | 3/1999 | Gillespie et al. |
| 6,137,427 A | 10/2000 | Binstead |
| 6,163,313 A | 12/2000 | Aroyan et al. |
| 6,188,391 B1 | 2/2001 | Seely et al. |

(Continued)

FOREIGN PATENT DOCUMENTS

| | | |
|---|---|---|
| CN | 1672119 A | 9/2005 |
| CN | 1711520 A | 12/2005 |

(Continued)

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Dah-Wei D Yuan
*Assistant Examiner* — Nga Leung V Law
(74) *Attorney, Agent, or Firm* — Joseph F. Guihan

(57) ABSTRACT

Fabrication of a touch sensor panel using laser ablation is disclosed. The fabricated touch sensor panel can have its touch sensors formed from conductive layers disposed on a surface such as an undersurface of the panel's cover substrate. A fabrication method can include ablating a first conductive layer to define the first part of the touch sensors and then ablating a second conductive layer proximate to the first conductive layer to define the second part of the touch sensors. The touch sensor panel can be incorporated into a mobile telephone, a digital media player, or a personal computer.

10 Claims, 9 Drawing Sheets

(56) References Cited

U.S. PATENT DOCUMENTS

| | | |
|---|---|---|
| 6,310,610 B1 | 10/2001 | Beaton et al. |
| 6,323,846 B1 | 11/2001 | Westerman et al. |
| 6,452,514 B1 | 9/2002 | Philipp |
| 6,690,387 B2 | 2/2004 | Zimmerman et al. |
| 6,730,863 B1 | 5/2004 | Gerpheide et al. |
| 6,970,160 B2 | 11/2005 | Mulligan et al. |
| 7,015,894 B2 | 3/2006 | Morohoshi |
| 7,030,860 B1 | 4/2006 | Hsu et al. |
| 7,129,935 B2 | 10/2006 | Mackey |
| 7,138,686 B1 | 11/2006 | Banerjee et al. |
| 7,184,064 B2 | 2/2007 | Zimmerman et al. |
| 7,538,760 B2 | 5/2009 | Hotelling et al. |
| 7,548,073 B2 | 6/2009 | Mackey et al. |
| 7,639,234 B2 | 12/2009 | Orsley |
| 7,663,607 B2 | 2/2010 | Hotelling et al. |
| 7,932,898 B2 | 4/2011 | Philipp et al. |
| 8,120,371 B2 | 2/2012 | Day et al. |
| 8,223,133 B2 | 7/2012 | Hristov |
| 8,258,986 B2 | 9/2012 | Makovetskyy |
| 8,259,078 B2 | 9/2012 | Hotelling et al. |
| 8,283,935 B2 | 10/2012 | Liu et al. |
| 8,319,747 B2 | 11/2012 | Hotelling et al. |
| 8,441,464 B1 | 5/2013 | Lin et al. |
| 8,479,122 B2 | 7/2013 | Hotelling et al. |
| 8,487,898 B2 | 7/2013 | Hotelling |
| 8,593,425 B2 | 11/2013 | Hong et al. |
| 8,614,688 B2 | 12/2013 | Chang |
| 8,957,874 B2 | 2/2015 | Elias |
| 2003/0076325 A1 | 4/2003 | Thrasher |
| 2004/0017362 A1 | 1/2004 | Mulligan et al. |
| 2004/0090429 A1 | 5/2004 | Geaghan et al. |
| 2004/0119701 A1 | 6/2004 | Mulligan et al. |
| 2004/0239650 A1 | 12/2004 | Mackey |
| 2005/0069718 A1 | 3/2005 | Voss-Kehl et al. |
| 2005/0073507 A1 | 4/2005 | Richter et al. |
| 2005/0083307 A1 | 4/2005 | Aufderheide et al. |
| 2005/0126831 A1 | 6/2005 | Richter et al. |
| 2005/0146509 A1 | 7/2005 | Geaghan et al. |
| 2005/0270039 A1 | 12/2005 | Mackey |
| 2005/0280639 A1 | 12/2005 | Taylor et al. |
| 2006/0026521 A1 | 2/2006 | Hotelling et al. |
| 2006/0038791 A1 | 2/2006 | Mackey |
| 2006/0132463 A1 | 6/2006 | Lee et al. |
| 2006/0146484 A1 | 7/2006 | Kim et al. |
| 2006/0197753 A1 | 9/2006 | Hotelling |
| 2006/0278444 A1 | 12/2006 | Binstead |
| 2007/0008299 A1 | 1/2007 | Hristov |
| 2007/0012665 A1* | 1/2007 | Nelson et al. ............ 219/121.69 |
| 2007/0074914 A1 | 4/2007 | Geaghan et al. |
| 2007/0229468 A1 | 10/2007 | Peng et al. |
| 2007/0229470 A1 | 10/2007 | Snyder et al. |
| 2007/0247443 A1 | 10/2007 | Philipp |
| 2007/0262963 A1 | 11/2007 | Xiao-Ping et al. |
| 2007/0279395 A1 | 12/2007 | Philipp et al. |
| 2007/0283832 A1 | 12/2007 | Hotelling |
| 2008/0024456 A1 | 1/2008 | Peng et al. |
| 2008/0062140 A1 | 3/2008 | Hotelling et al. |
| 2008/0074398 A1 | 3/2008 | Wright |
| 2008/0136787 A1 | 6/2008 | Yeh et al. |
| 2008/0158167 A1 | 7/2008 | Hotelling et al. |
| 2008/0158181 A1 | 7/2008 | Hamblin et al. |
| 2008/0264699 A1 | 10/2008 | Chang et al. |
| 2008/0277259 A1 | 11/2008 | Chang |
| 2008/0283175 A1 | 11/2008 | Hagood et al. |
| 2008/0303022 A1 | 12/2008 | Tai et al. |
| 2008/0309633 A1 | 12/2008 | Hotelling et al. |
| 2008/0309635 A1 | 12/2008 | Matsuo |
| 2009/0002337 A1 | 1/2009 | Chang |
| 2009/0019344 A1 | 1/2009 | Yoon et al. |
| 2009/0054107 A1 | 2/2009 | Feland et al. |
| 2009/0085894 A1 | 4/2009 | Gandhi et al. |
| 2009/0091551 A1 | 4/2009 | Hotelling et al. |
| 2009/0135157 A1 | 5/2009 | Harley |
| 2009/0182189 A1 | 7/2009 | Lira |
| 2009/0184937 A1 | 7/2009 | Grivna |
| 2009/0205879 A1 | 8/2009 | Halsey, IV et al. |
| 2009/0207151 A1* | 8/2009 | Liu ........................ G06F 3/044 345/174 |
| 2009/0236151 A1 | 9/2009 | Yeh et al. |
| 2009/0242283 A1 | 10/2009 | Chiu |
| 2009/0267902 A1 | 10/2009 | Nambu et al. |
| 2009/0273577 A1 | 11/2009 | Chen et al. |
| 2009/0303189 A1 | 12/2009 | Grunthaner et al. |
| 2009/0309850 A1 | 12/2009 | Yang |
| 2009/0314621 A1 | 12/2009 | Hotelling |
| 2009/0315854 A1 | 12/2009 | Matsuo |
| 2009/0322702 A1 | 12/2009 | Chien et al. |
| 2010/0001973 A1 | 1/2010 | Hotelling et al. |
| 2010/0007616 A1 | 1/2010 | Jang |
| 2010/0059294 A1 | 3/2010 | Elias et al. |
| 2010/0079384 A1 | 4/2010 | Grivna |
| 2010/0110035 A1 | 5/2010 | Selker |
| 2010/0117985 A1 | 5/2010 | Wadia |
| 2010/0143848 A1 | 6/2010 | Jain et al. |
| 2010/0149108 A1 | 6/2010 | Hotelling et al. |
| 2010/0182255 A1* | 7/2010 | Jeong ........................ G06F 3/044 345/173 |
| 2010/0194696 A1 | 8/2010 | Chang et al. |
| 2010/0253638 A1 | 10/2010 | Yousefpor et al. |
| 2010/0328228 A1 | 12/2010 | Elias |
| 2010/0328248 A1 | 12/2010 | Mozdzyn |
| 2011/0007020 A1 | 1/2011 | Hong |
| 2011/0025629 A1 | 2/2011 | Grivna et al. |
| 2011/0096016 A1* | 4/2011 | Yilmaz ........................ 345/174 |
| 2011/0134050 A1 | 6/2011 | Harley |
| 2012/0044199 A1 | 2/2012 | Karpin et al. |
| 2012/0113047 A1 | 5/2012 | Hanauer |
| 2012/0154324 A1 | 6/2012 | Wright et al. |
| 2012/0169652 A1 | 7/2012 | Chang |
| 2012/0169653 A1 | 7/2012 | Chang |
| 2012/0169655 A1 | 7/2012 | Chang |
| 2012/0169656 A1 | 7/2012 | Chang |
| 2013/0120303 A1 | 5/2013 | Hong et al. |
| 2014/0347574 A1 | 11/2014 | Tung et al. |

FOREIGN PATENT DOCUMENTS

| | | |
|---|---|---|
| CN | 1782837 A | 6/2006 |
| CN | 1818842 A | 8/2006 |
| CN | 1864124 A | 11/2006 |
| CN | 1945516 A | 4/2007 |
| CN | 101046720 A | 10/2007 |
| CN | 101071354 A | 11/2007 |
| DE | 11 2008 001 245 T5 | 3/2010 |
| EP | 0 853 230 A1 | 7/1998 |
| EP | 1 192 585 A1 | 4/2002 |
| EP | 1 192 585 B1 | 4/2002 |
| EP | 1 573 706 A2 | 2/2004 |
| EP | 1 573 706 A3 | 2/2004 |
| EP | 1 644 918 A2 | 12/2004 |
| EP | 1986084 A1 * | 10/2008 |
| EP | 2 077 489 A1 | 7/2009 |
| GB | 1 546 317 A | 5/1979 |
| GB | 2 144 146 A | 2/1985 |
| GB | 2 428 306 A | 1/2007 |
| GB | 2 437 827 A | 11/2007 |
| GB | 2450207 A | 12/2008 |
| JP | 2000-163031 A | 6/2000 |
| JP | 2002-342033 A | 11/2002 |
| JP | 2004-503835 A | 2/2004 |
| JP | 2005-084128 A | 3/2005 |
| JP | 2007-018515 A | 1/2007 |
| JP | 2008-510251 A | 4/2008 |
| TW | M344522 | 11/2008 |
| TW | M344544 | 11/2008 |
| WO | WO-01/97204 A1 | 12/2001 |
| WO | WO-2005/114369 A3 | 12/2005 |
| WO | WO-2006/023147 A3 | 3/2006 |
| WO | WO-2006/104745 A3 | 10/2006 |
| WO | WO-2006/130584 A3 | 12/2006 |
| WO | WO-2007/012899 A1 | 2/2007 |
| WO | WO-2007/034591 A1 | 3/2007 |
| WO | WO-2007/115032 A2 | 10/2007 |
| WO | WO-2007/146785 A3 | 12/2007 |

(56) References Cited

FOREIGN PATENT DOCUMENTS

| | | |
|---|---|---|
| WO | WO-2008/007118 A3 | 1/2008 |
| WO | WO-2008/076237 A2 | 6/2008 |
| WO | WO-2008/108514 A1 | 9/2008 |
| WO | WO-2008/135713 A1 | 11/2008 |
| WO | WO-2009/046363 A1 | 4/2009 |
| WO | WO-2009/103946 A1 | 8/2009 |
| WO | WO-2009/132146 A1 | 10/2009 |
| WO | WO-2009/132150 A1 | 10/2009 |
| WO | WO-2010/117882 A2 | 10/2010 |
| WO | WO-2011/137200 A1 | 11/2011 |

OTHER PUBLICATIONS

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.
Rubine, D.H. (May 1992). "Combining Gestures and. Direct Manipulation," CHI '92, pp. 659-660.
U.S. Appl. No. 12/642,466, by Harley, filed Dec. 18, 2009. (copy not attached).
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Cassidy, R. (Feb. 23, 2007). "The Tissot T-Touch Watch—A Groundbreaking Timepiece," located at <http://ezinearticles.com/?The-Tissot-T-Touch-Watch—A-Groundbreaking-Timepiece&id . . . >, last visited Jan. 23, 2009, two pages.
Chinese Search Report mailed Jan. 7, 2011, for CN Application No. 2009200081997, filed Apr. 24, 2009, with English Translation, 14 pages.
Chinese Search Report mailed Jan. 10, 2011, for CN Application No. 2008201338142, filed Sep. 27, 2008, with English Translation, 25 pages.
Chinese Search Report completed Jun. 3, 2011, for CN Patent Application No. ZL2009201524013, with English Translation, 20 pages.
European Search Report mailed Mar. 19, 2009, for EP Application No. 08017396.6, filed Oct. 8, 2008, seven pages.
Final Office Action mailed Jun. 8, 2011, for U.S. Appl. No. 12/038,760, filed Feb. 27, 2008, 20 pages.
Final Office Action mailed Dec. 15, 2011, for U.S. Appl. No. 12/333,250, filed Dec. 11, 2008, 12 pages.
Final Office Action mailed Jan. 5, 2012, for U.S. Appl. No. 12/206,680, filed Sep. 8, 2008, 15 pages.
Final Office Action mailed Jan. 19, 2012, for U.S. Appl. No. 12/110,024, filed Apr. 25, 2008, 12 pages.
Final Office Action mailed Aug. 31, 2012, for U.S. Appl. No. 12/110,075, filed Apr. 25, 2008, 15 pages.
Final Office Action mailed Dec. 24, 2012, for U.S. Appl. No. 12/110,024, filed Apr. 25, 2008, 21 pages.
Final Office Action mailed Jan. 3, 2013, for U.S. Appl. No. 11/818,498, filed Jun. 13, 2007, 17 pages.
Final Office Action mailed Feb. 5, 2013, for U.S. Appl. No. 12/500,911, filed Jul. 10, 2009, 15 pages.
Final Office Action mailed Apr. 30, 2013, for U.S. Appl. No. 12/494,173, filed Jun. 29, 2009, 7 pages.
Final Office Action mailed May 22, 2013, for U.S. Appl. No. 12/206,680, filed Sep. 8, 2008, 16 pages.
Final Office Action mailed Jul. 19, 2013, for U.S. Appl. No. 12,545/604, filed Aug. 21, 2009, 17 pages.
Great Britain Search Report mailed Jan. 19, 2009, for GB Application No. GB0817242.1, filed Sep. 22, 2008, two pages.
Great Britain Search Report mailed Jan. 19, 2010, for GB Application No. GB0817242.1, filed Sep. 22, 2008, two pages.
International Search Report mailed on Mar. 19, 2009, for PCT Application No. PCT/US2008/078836, filed on Oct. 3, 2008, four pages.
International Search Report mailed Jul. 17, 2009, for PCT Application No. PCT/US2009/041460, three pages.
International Search Report mailed Aug. 5, 2009, for PCT Application No. PCT/US2009/041465, filed Apr. 22, 2009, four pages.
International Search Report mailed Jan. 14, 2011, for PCT Application No. PCT/US2010/029698, filed Apr. 1, 2010, 4 pages.
Non-Final Office Action mailed Feb. 4, 2011, for U.S. Appl. No. 12/038,760, filed Feb. 27, 2008, 18 pages.
Non-Final Office Action mailed Jun. 9, 2011, for U.S. Appl. No. 12/206,680, filed Sep. 8, 2008, 13 pages.
Non-Final Office Action mailed Jul. 8, 2011, for U.S. Appl. No. 12/110,075, filed Apr. 25, 2008, 14 pages.
Non-Final Office Action mailed Jul. 11, 2011, for U.S. Appl. No. 12/110,024, filed Apr. 25, 2008, 12 pages.
Non-Final Office Action mailed Aug. 17, 2011, for U.S. Appl. No. 12/333,250, filed Dec. 11, 2008, 12 pages.
Non-Final Office Action mailed Jan. 25, 2012, for U.S. Appl. No. 12/110,075, filed Apr. 25, 2008, 21 pages.
Non-Final Office Action mailed May 25, 2012, for U.S. Appl. No. 11/818,498, filed Jun. 13, 2007, 16 pages.
Non-Final Office Action mailed Jun. 7, 2012, for U.S. Appl. No. 12/500,911, filed Jul. 10, 2009, 16 pages.
Non-Final Office Action mailed Jul. 3, 2012, for U.S. Appl. No. 12/110,024, filed Apr. 25, 2008, 19 pages.
Non-Final Office Action mailed Sep. 26, 2012, for U.S. Appl. No. 12/206,680, filed Sep. 8, 2008, 14 pages.
Non-Final Office Action mailed Nov. 28, 2012, for U.S. Appl. No. 12/494,173, filed Jun. 29, 2009, six pages.
Non-Final Office Action mailed Jan. 2, 2013, for U.S. Appl. No. 12/038,760, filed Feb. 27, 2008, 20 pages.
Non-Final office Action mailed Jan. 7, 2013, for U.S. Appl. No. 12/545,604, filed Aug. 21, 2009, 12 pages.
Non-Final Office Action mailed Mar. 28, 2013, for U.S. Appl. No. 12/110,075 filed Apr. 25, 2008, 14 pages.
Non-Final Office Action mailed Mar. 29, 2013 for U.S. Appl. No. 13/737,779, filed Jan. 9, 2013, nine pages.
Non-Final Office Action mailed Sep. 30, 2013, for U.S. Appl. No. 12/206,680, filed Sep. 8, 2008, 18 pages.
Non-Final office Action mailed Dec. 19, 2013, for U.S. Appl. No. 12/545,604, filed Aug. 21, 2009, 17 pages.
Notice of Allowance mailed Aug. 28, 2012, for U.S. Appl. No. 12/333,250, filed Dec. 11, 2008, nine pages.
Notice of Allowance mailed May 23, 2013, for U.S. Appl. No. 12/110,024, filed Apr. 25, 2008, five pages.
Notice of Allowance mailed Aug. 19, 2013, for U.S. Appl. No. 12/500,911, filed Jul. 10, 2009, six pages.
Notice of Allowance mailed Sep. 3, 2013, for U.S. Appl. No. 13/737,779, filed Jan. 9, 2013, 10 pages.
Search Report mailed Apr. 29, 2009, for NL Application No. 2001672, with English translation of Written Opinion, eight pages.
Final Office Action mailed Feb. 1, 2013, for U.S. Appl. No. 12/642,466, filed Dec. 18, 2009, nine pages.
Final Office Action mailed Jan. 27, 2014, for U.S. Appl. No. 12/206,680, filed Sep. 8, 2008, 20 pages.
International Search Report mailed May 2, 2011, for PCT Application No. PCT/US2010/058988, filed Dec. 3, 2010, four pages.
Non-Final Office Action mailed Aug. 28, 2012, for U.S. Appl. No. 12/642,466, filed Dec. 18, 2009, nine pages.
Non-Final Office Action mailed Nov. 8, 2013, for U.S. Appl. No. 12/642,466, filed Dec. 18, 2009, 12 pages.
Final Office Action mailed May 9, 2014, for U.S. Appl. No. 12/642,466, filed Dec. 18, 2009, 13 pages.
Final Office Action mailed Jul. 16, 2014, for U.S. Appl. No. 12/545,604, filed Aug. 21, 2009, 18 pages.
Non-Final Office Action mailed Apr. 10, 2014, for U.S. Appl. No. 14/055,717, filed Oct. 16, 2013, 10 pages.
Notice of Allowance mailed Nov. 7, 2014, for U.S. Appl. No. 14/055,717, filed Oct. 16, 2013, six pages.
Notice of Allowance mailed Oct. 15, 2014, for U.S. Appl. No. 12/494,173, filed Jun. 29, 2009, eight pages.

\* cited by examiner

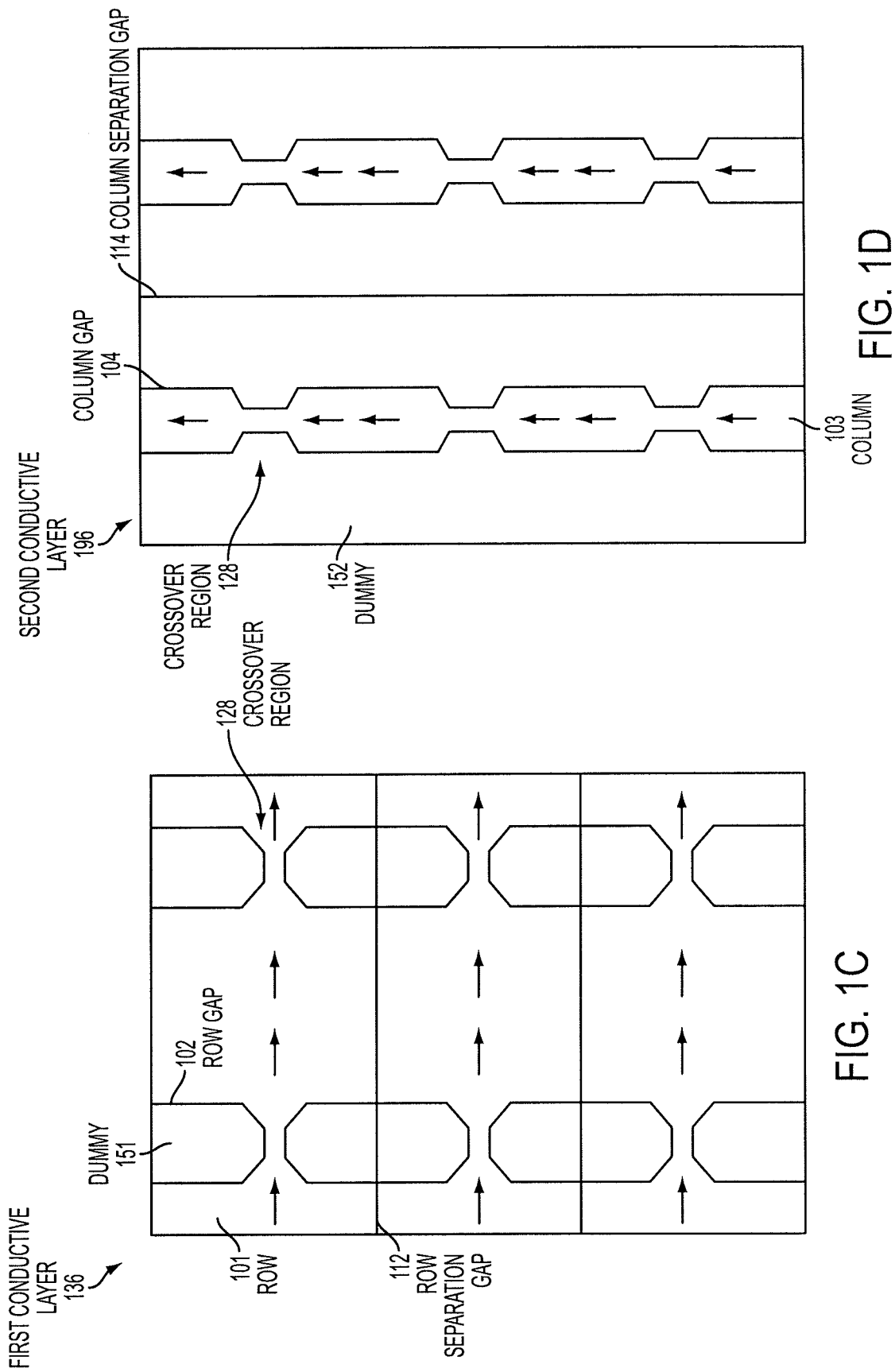

FABRICATION OF TOUCH SENSOR PANEL USING LASER ABLATION

FIELD

This relates generally to touch sensor panels and, more particularly, to fabrication of a touch sensor panel using laser ablation.

BACKGROUND

Touch sensor panels are increasingly used as input devices to a computing system. Generally, a touch sensor panel can include a cover substrate (formed from glass, polymer, or the like) to input information via touch and a sensor substrate (also formed from glass, polymer, or the like) with touch sensors to sense the touch on the cover substrate. In a drive to make a thinner touch sensor panel, it is desirable to eliminate the unwanted thickness of the sensor substrate. However, successfully providing a touch sensor panel without the sensor substrate has not been easy.

Elimination of the sensor substrate requires that the touch sensors be located on preferably another existing surface in the panel. One such surface has been the cover substrate. However, the cover substrate has proven to be a difficult option for at least some of the following reasons. In some embodiments, the cover substrate is glass that has been cut and shaped from a motherglass sheet. Then, for strength and durability, the cover glass is typically chemically treated with a strong ionic solution to strengthen all the glass surfaces, including the cut, shaped edges. Because chemical strengthening can damage the thin films of the touch sensors, it can be ineffective to place the touch sensors on the cover glass prior to strengthening. However, after the chemical strengthening has been completed, conventional touch sensor placement processes, such as photolithography and etching, which were developed for the larger motherglass sheets, can be either technically infeasible or too costly for the smaller cover glass. As a result, it can be difficult to use conventional placement processes to place the touch sensors on the cover glass after strengthening.

Accordingly, this approach to thinner touch sensor panels has been problematic.

SUMMARY

This relates to fabrication of a touch sensor panel using laser ablation, in which the panel's touch sensors can be formed from two conductive layers on a surface such as an undersurface of the panel's cover substrate. A fabrication method can include ablating a first conductive layer to define a first part of the touch sensors and then ablating a second conductive layer proximate to the first conductive layer to define a second part of the touch sensors. Another fabrication method can include ablating a first conductive layer to partially define the first part of the touch sensors, then ablating the first conductive layer and a proximate second conductive layer together to define the remainder of the first part of the touch sensors in the first conductive layer and to partially define the second part of the touch sensors in the second conductive layer, and finally ablating the second conductive layer to define the remainder of the second part of the touch sensors. These fabrication methods can advantageously provide touch sensors on an undersurface of a cover substrate of a touch sensor panel, thereby resulting in a thinner panel. Additionally, using conductive layers rather than discrete elements to form the touch sensors can avoid some visual artifacts that might otherwise appear in the panel.

BRIEF DESCRIPTION OF THE DRAWINGS

FIGS. 1a through 1d illustrate an exemplary touch sensor panel fabricated using laser ablation according to various embodiments.

DETAILED DESCRIPTION

In the following description of various embodiments, reference is made to the accompanying drawings which form a part hereof, and in which it is shown by way of illustration specific embodiments which can be practiced. It is to be understood that other embodiments can be used and structural changes can be made without departing from the scope of the various embodiments.

This relates to fabrication of a touch sensor panel using laser ablation. The fabricated touch sensor panel can have touch sensors formed from two conductive layers disposed on a surface such as an undersurface of a cover substrate. A fabrication method can include depositing a first conductive layer onto a substrate, ablating the first conductive layer to define part of the touch sensors, depositing a dielectric material onto the first conductive layer to separate the first and subsequently deposited second conductive layers, depositing the second conductive layer onto the dielectric layer, and ablating the second conductive layer to define the remaining part of the touch sensors. Another fabrication method can include depositing a first conductive layer onto a substrate, ablating the first conductive layer to define first crossover portions of the touch sensors (crossover referring to portions of the touch sensors, e.g., rows and columns, crossing over each other), depositing a dielectric layer onto the first conductive layer to separate the first and subsequently deposited second conductive layers, depositing the second conductive layer onto the dielectric layer, ablating all three layers together to complete the portion of the touch sensors in the first conductive layer and to define part of the touch sensors in the second conductive layer, and further ablating the second conductive layer to define second crossover portions of the touch sensors to complete the portion of the touch sensors in the second conductive layer.

These fabrication methods can advantageously provide touch sensors on surfaces such as an undersurface of a cover substrate of a touch sensor panel, thereby resulting in a thinner panel. Additionally, using conductive layers that fully blanket the cover substrate can avoid some visual artifacts in the panel that might otherwise appear with discrete conductive elements.

Figure 1A:
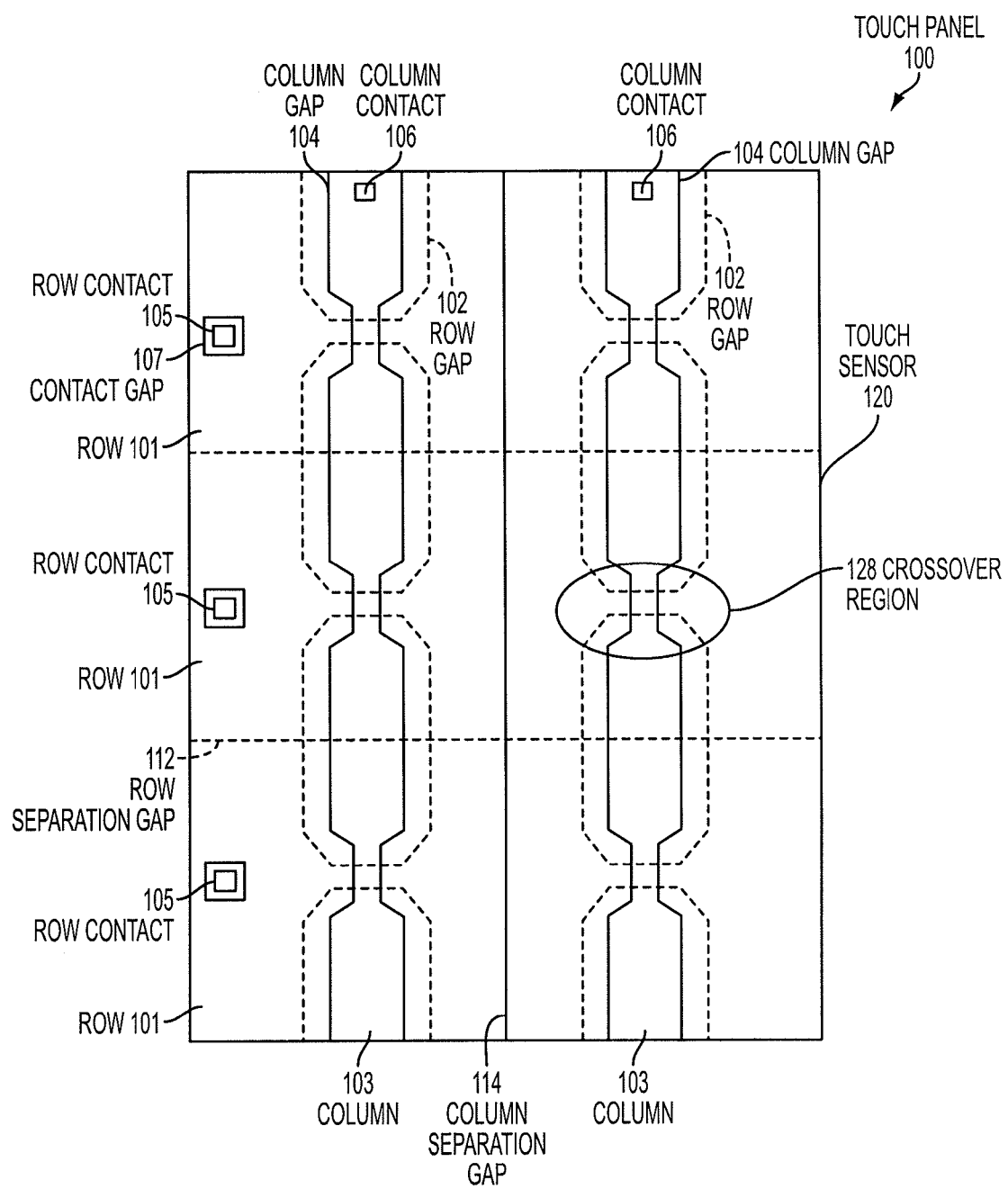
Figure 1B:
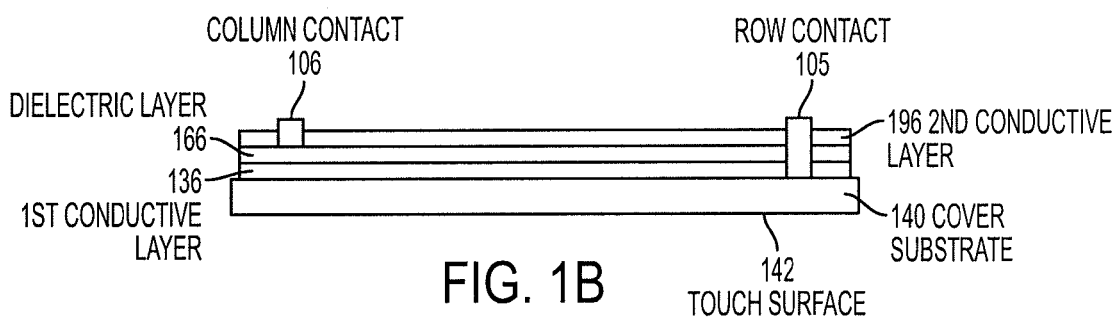

FIGS. 1a through 1d illustrate an exemplary touch sensor panel fabricated using laser ablation according to various embodiments. FIG. 1a illustrates a plan view of the exemplary touch sensor panel's cover substrate's undersurface. FIG. 1b illustrates a cross-sectional view of the panel. FIG. 1c illustrates a plan view of a first conductive layer of the panel with horizontal components of the panel's touch sensors. FIG. 1d illustrates a plan view of a second conductive layer of the panel with vertical components of the panel's touch sensors. In the examples of FIGS. 1a through 1d, touch sensor panel 100 can include cover substrate 140 having touch surface 142 for touching by an object, such as a user's finger, a stylus, and the like. The touch sensor panel 100 can also include first conductive layer 136, dielectric layer 166, and second conductive layer 196 on an undersurface of the cover substrate 140, where the conductive layers can form touch sensors 120 for sensing a touch on the touch surface 142 and the dielectric layer 166 can electrically isolate the conductive layers from each other.

The first conductive layer 136 can be ablated using a laser to define row components of the touch sensors 120. As illustrated in FIG. 1c, the first conductive layer 136 can be ablated to make row gaps 102 to separate the rows 101 from dummy regions 151. Although various gaps (e.g., row gaps, column gaps, contact gaps, row separation gaps, column separation gaps, and so on) are symbolically illustrated herein as lines, these gaps are actually areas at which the conductive layer material has been removed, thereby segmenting the conductive layer into multiple pieces. The row gaps 102 can isolate the rows 101, which can be electrically charged during operation (as illustrated by the horizontal arrows), from the dummy regions 151, which are electrically isolated during operation. By being electrically isolated, the dummy regions 151 can not electrically interfere with the columns 103 in the proximate second conductive layer 196. The first conductive layer 136 can be further ablated to make row separation gaps 112 to separate the rows 101 from each other. The separation gaps 112 can prevent the rows 101 from electrically interfering with each other.

The second conductive layer 196 can be ablated using a laser to define column components of the touch sensors 120. As illustrated in FIG. 1d, the second conductive layer 196 can be ablated to make column gaps 104 to separate the columns 103 from dummy regions 152. The column gaps 104 can isolate the columns 103, which are electrically charged during operation (as illustrated by the vertical arrows), from the dummy regions 152, which are electrically isolated during operation. By being electrically isolated, the dummy regions 152 can not electrically interfere with the rows 101 in the proximate first conductive layer 136. Optionally, the second conductive layer 196 can be further ablated to make column separation gaps 114 across the layer. The column separation gaps 114 can be regularly spaced with the column gaps 104 so as to reduce visual sensitivity to the column gaps had the column gaps been provided alone. In addition to simple lines, other patterns can be created in the dummy regions 151 and 152, as well as in the regions of the rows 101 and the columns 103 to minimize visual sensitivity to the gaps defining the rows and columns.

The rows 101 of the first conductive layer 136 and the columns 103 of the second conductive layer 196 can cross over each other to form capacitive touch sensors 120. The first conductive layer 136 and the second conductive layer 196 can be ablated to be substantially narrower at the crossover regions 128 so as to reduce the coupling area between the two layers, thereby reducing the amount of unwanted capacitive coupling therebetween.

In the example of FIG. 1a, first conductive layer 136 is underneath the second conductive layer 196, which is symbolically illustrated by dashed lines for the first conductive layer's row gaps 102 and row separation gaps 112. It is to be understood however that the first and second conductive layers could be reversed with the second conductive layer underneath, depending on the needs of the panel.

In some embodiments, the rows 101 can be drive lines and the columns 103 can be sense lines, where the rows can drive the touch sensors 120 to sense a touch at the touch sensor panel 100 and the columns can transmit a touch signal indicative of the touch to sense circuitry (not shown). Column contacts 106 can electrically connect the columns 103 to the sense circuitry for further processing. As illustrated in FIGS. 1a and 1b, each column 103 can have a column contact 106 disposed at one end of the column. Row contacts 105 can electrically connect the rows 101 to drive circuitry to receive drive signals. As illustrated in FIGS. 1a and 1b, each row 101 can have a row contact 105 disposed at one end of the row. Because the first conductive layer 136 is covered by the dielectric layer 166 and the second conductive layer 196, openings can be made in the dielectric layer and the second conductive layer to reach the first conductive layer so as to contact the rows. To prevent the first and second conductive layers 136, 196 from unwanted coupling at the openings, the second conductive layer can be further ablated to form contact gap 107 around the row contacts 105 so as to electrically isolate the contacts from the second conductive layer.

In some alternate embodiments, the rows 101 can be the sense lines and the columns 103 can be the drive lines, where the columns can drive the touch sensors 120 to sense a touch and the rows can transmit a touch signal to sense circuitry for further processing.

The cover substrate 140 can be glass, polymer, or any suitable material for providing a touch surface and a touch sensor surface. The conductive layers 136, 196 can be indium-tin-oxide (ITO), polymers, or any suitable conductive material. The conductive material can be transparent, semi-transparent, or opaque according to the needs of the touch sensor panel. The dielectric layer 166 can be any suitable insulating material. The dielectric material can also be transparent, semi-transparent, or opaque according to the needs of the panel. The row and column contacts can be conductive carbon ink, silver ink, or any suitable conductive material.

It is to be understood that the touch sensors 120 are not limited to a row-column arrangement illustrated here, but can include radial, circular, diamond, and other arrangements capable of sensing a touch.

Figure 2:
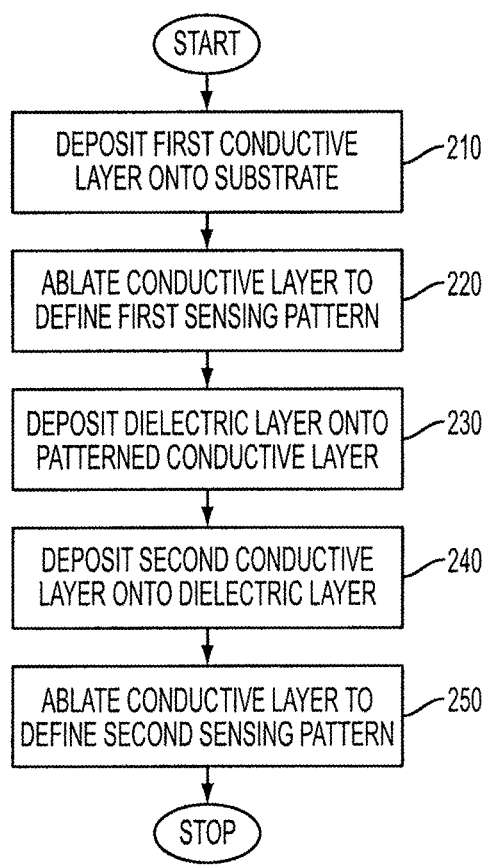
FIG. 2 illustrates an exemplary method for fabricating a touch sensor panel using laser ablation according to various embodiments.

FIG. 2 illustrates an exemplary method for fabricating a touch sensor panel using laser ablation according to various embodiments. In the example of FIG. 2, a first conductive layer can be deposited onto a surface such as an undersurface of a cover substrate to blanket the undersurface, where the undersurface is opposite the cover substrate's touch surface (210). The conductive layer can be deposited using a sputtering technique, for example.

A laser can ablate the first conductive layer to define rows for touch sensors (220). The laser can remove some strips of the conductive layer to create gaps separating and electrically isolating the rows from each other and separating and electrically isolating the rows from dummy regions. The gaps can be patterned to divide the conductive layer into essentially horizontal continuous regions (forming rows) and essentially vertical discontinuous regions (forming dummy regions), where the horizontal regions can have narrowing portions at locations where the rows will cross over with the columns of the later deposited second conductive layer. Other patterns of the first conductive layer are also possible according to the desired touch sensor arrangement.

A dielectric layer can be deposited onto the first conductive layer to blanket the layer (230). The dielectric layer can be deposited using a sputtering technique or as a liquid polymer that is cured, for example. A second conductive layer can be deposited onto the dielectric layer to blanket the dielectric layer (240). The conductive layer can be deposited using a sputtering technique, for example.

A laser can ablate the second conductive layer to define columns for touch sensors (250). The laser can remove some strips of the conductive layer to create gaps separating and electrically isolating the columns from dummy regions. The gaps can be patterned to divide the conductive layer into essentially vertical continuous regions (forming columns) and essentially horizontal discontinuous regions (forming dummy regions), where the vertical regions can have narrowing portions at locations where the columns will cross over with the rows of the underlying first conductive layer. The laser can further remove some of the second conductive layer to create gaps separating and electrically isolating the layer from electrical contacts to the underlying rows. Optionally, the laser can remove some of the conductive layer to create vertical gaps at regular spacing between adjacent columns so as to reduce visual sensitivity to the column gaps. Other patterns of the second conductive layer are also possible according to the desired touch sensor arrangement.

The dielectric layer can absorb laser light during ablation of the second conductive layer to prevent the light from adversely affecting the underlying first conductive layer.

In some alternate embodiments, the first conductive layer can be ablated to define columns and the second conductive layer can be ablated to define rows similar to the method of FIG. 2.

Figure 3A:
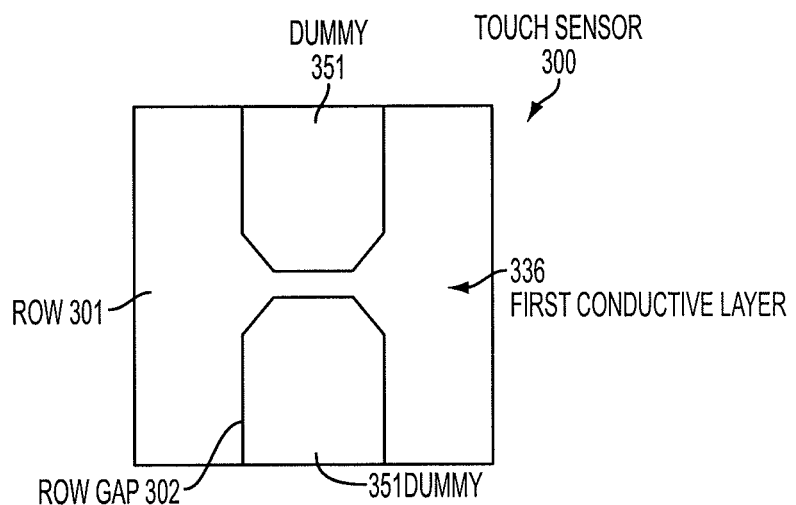
FIGS. 3a through 3c illustrate an exemplary touch sensor panel fabricated using the method of FIG. 2 according to various embodiments.
Figure 3B:
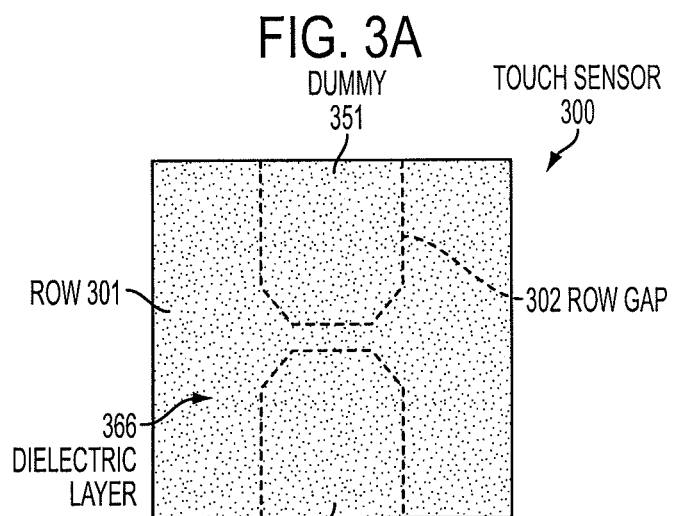
Figure 3C:
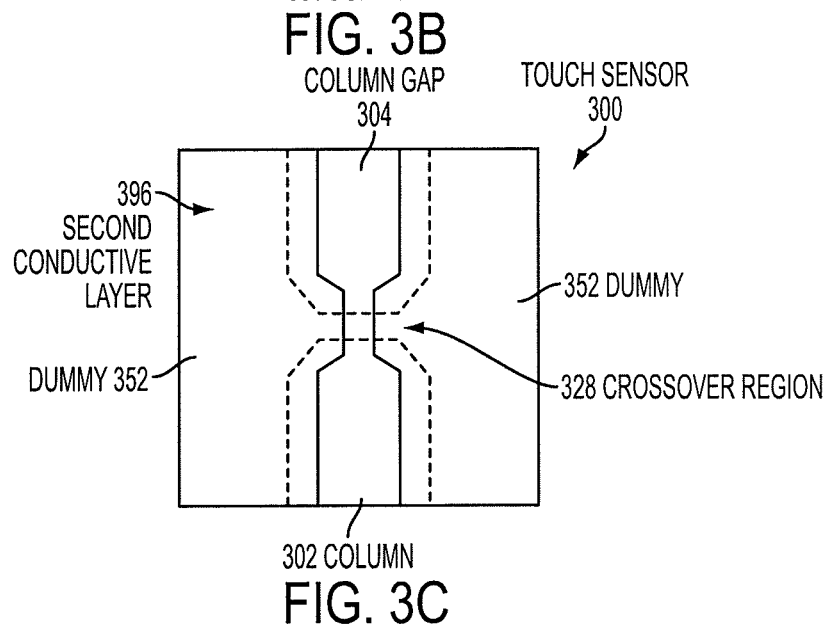

FIGS. 3a through 3c illustrate an exemplary touch sensor panel fabricated using the method of FIG. 2. In the example of FIG. 3a, touch sensor 300 of a touch sensor panel can include first conductive layer 336 deposited onto a surface such as a cover substrate (not shown), where the conductive layer can be ablated to define row 301 and dummy region 351. Row gap 302 made during the ablation can separate and electrically isolate the row 301 from the dummy region 351. A horizontal row gap (not shown) made during the ablation can separate the row 301 from an adjacent row. The row 301 can include a narrowing portion at the crossover region with the to-be-defined column. In the example of FIG. 3b, dielectric layer 366 can be deposited onto the first conductive layer 336 to cover the ablated row and dummy region pattern. The first conductive layer 336 being underneath the dielectric layer 366 is symbolically illustrated by the dashed lines for the row gaps 302. In the example of FIG. 3c, second conductive layer 396 can be deposited onto the dielectric layer 366 to cover the dielectric layer. The second conductive layer 396 can be ablated to define column 302 and dummy regions 352. Column gap 304 made during the ablation can separate and electrically isolate the column 302 from the dummy regions 352. A vertical column gap (not shown) can optionally be made during ablation between adjacent columns. The column 302 can include a narrowing portion at the crossover region 328 with the underlying row's 301 narrowing portion. The column gap 304 can be located so that the column 302 falls within the boundary of the first conductive layer's dummy region 351, with some offset so that the gaps are not too close that they appear as one thick gap.

Figure 4:
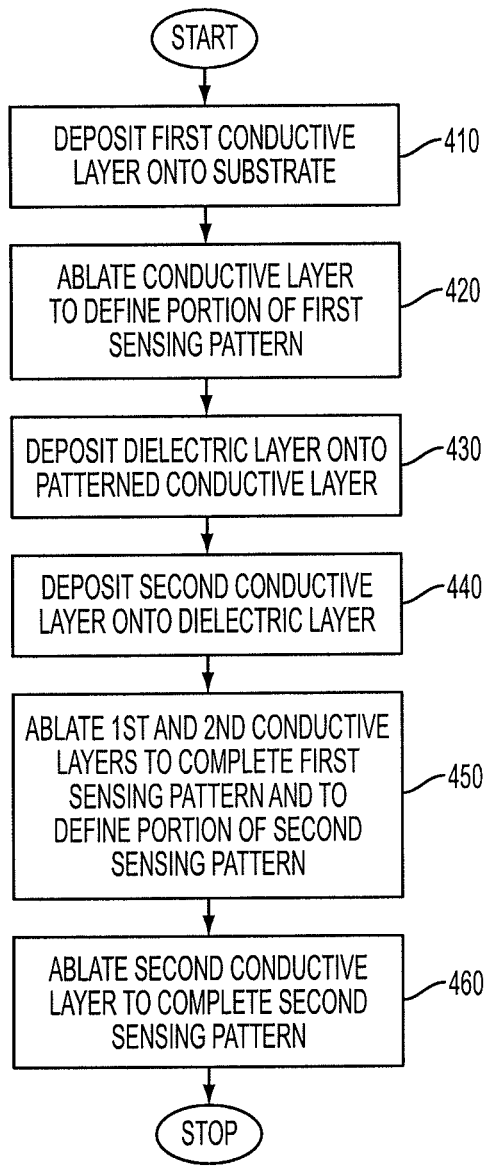
FIG. 4 illustrates another exemplary method for fabricating a touch sensor panel using laser ablation according to various embodiments.

FIG. 4 illustrates another exemplary method for fabricating a touch sensor panel using laser ablation according to various embodiments. In the example of FIG. 4, a first conductive layer can be deposited onto a surface such as an undersurface of a cover substrate to blanket the undersurface, where the undersurface is opposite the cover substrate's touch surface (410). The conductive layer can be deposited using a sputtering technique, for example.

A laser can ablate the first conductive layer to partially define rows for touch sensors (420). The laser can remove some of the conductive layer to create horizontal gaps at positions where the rows will cross over with the columns of the later deposited second conductive layer. The laser can also remove some of the first conductive layer to create gaps separating and electrically isolating the rows from each other.

A dielectric layer can be deposited onto the first conductive layer to blanket the layer (430). The dielectric layer can be deposited using a sputtering technique, for example. A second conductive layer can be deposited onto the dielectric layer to blanket the dielectric layer (440). The conductive layer can be deposited using a sputtering technique, for example.

A laser can ablate the first conductive layer further, the dielectric layer, and the second conductive layer at the same time to define the remaining portions of the rows for the touch sensors in the first conductive layer and to partially define columns for the touch sensors in the second conductive layer (450). For the first conductive layer, the laser can remove more of the conductive layer to create additional gaps that connect with the previously-made horizontal gaps, thereby completing the row gaps in the first conductive layer. The completed gaps can separate and electrically isolate the rows from dummy regions. The row gaps can be patterned to divide the conductive layer into essentially horizontal continuous regions (forming rows) and essentially vertical discontinuous regions (forming dummy regions), where the horizontal regions can have narrowing portions at locations where the rows will cross over with the columns of the later deposited second conductive layer.

For the second conductive layer, the laser can remove some of the conductive layer to create vertical gaps that define most of the columns, except the portions where the columns will cross over the underlying rows A laser can further ablate the second conductive layer to define the crossover portions of the columns for the touch sensors (460). The laser can remove more of the conductive layer to create vertical gaps at the positions where the columns cross over the underlying rows. The vertical gaps can connect with the previously-made gaps to complete the column gaps in the second conductive layer. The completed gaps can separate and electrically isolate the columns from dummy regions. The column gaps can be patterned to divide the conductive layer into essentially vertical continuous regions (forming columns) and essentially horizontal discontinuous regions (forming dummy regions), where the vertical regions can have narrowing portions at locations where the columns will cross over with the rows of the underlying first conductive layer. The laser can further remove some of the conductive layer to create gaps separating and electrically isolating the layer from electrical contacts to the underlying rows. Optionally, the laser can remove some of the conductive layer to create vertical gaps at regular spacing between adjacent columns so as to reduce visual sensitivity to the column gaps.

Other patterns of the first and second conductive layers are also possible according to the desired touch sensor arrangement.

The laser wavelength, pulse duration, power, and the like can be tuned so that the laser can ablate the first conductive layer, then ablate both conductive layers and the dielectric layer together, and then ablate only the second conductive layer without adversely affecting the underlying first conductive layer.

In some alternate embodiments, the first conductive layer can be ablated to define columns and the second conductive layer can be ablated to define rows. In such an alternate embodiment, the first conductive layer can be ablated to form the pairs of vertical gaps. All the layers can be ablated to complete the columns in the first conductive layer and to partially define the rows in the second conductive layer. The second conductive layer can be ablated to form the pairs of horizontal gaps to complete the rows in the second conductive layer.

Figure 5A:
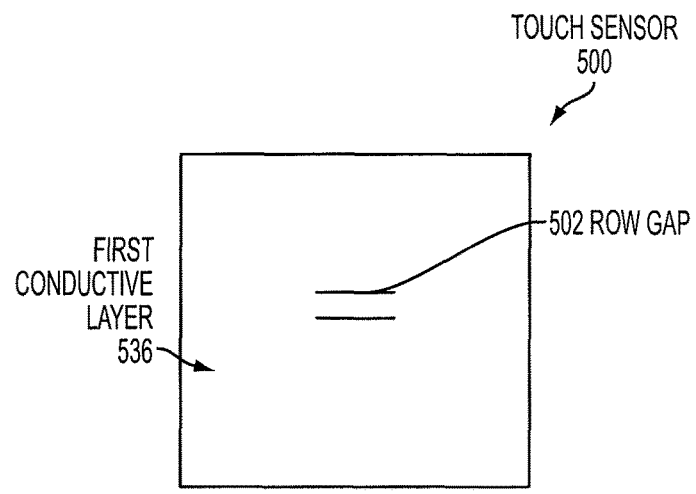
FIGS. 5a through 5d illustrate an exemplary touch sensor panel fabricated using the method of FIG. 4 according to various embodiments.
Figure 5B:
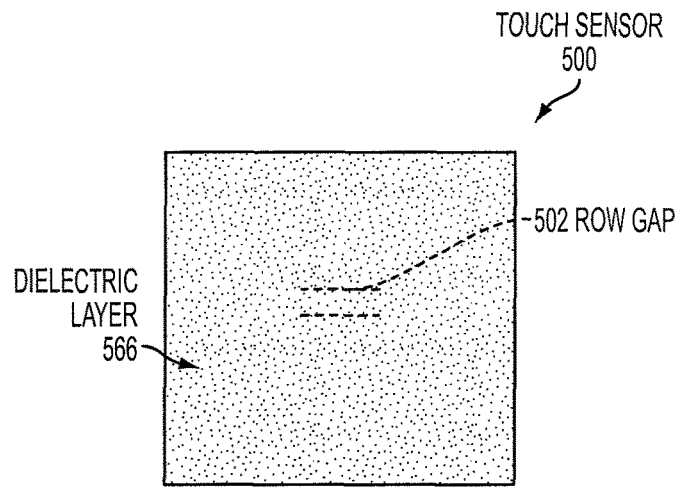
Figure 5C:
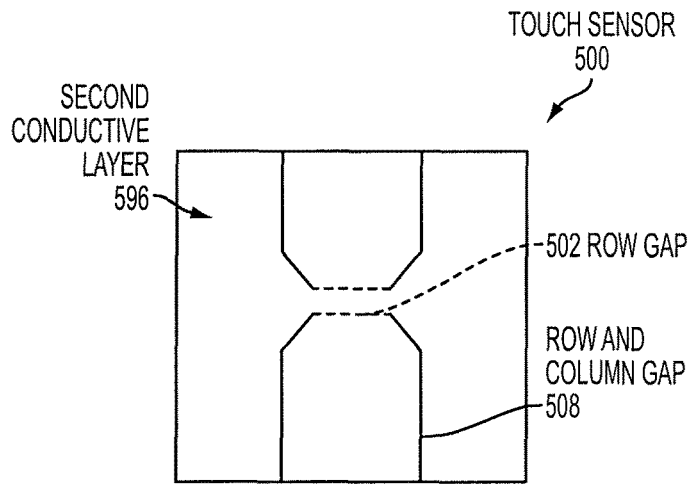
Figure 5D:
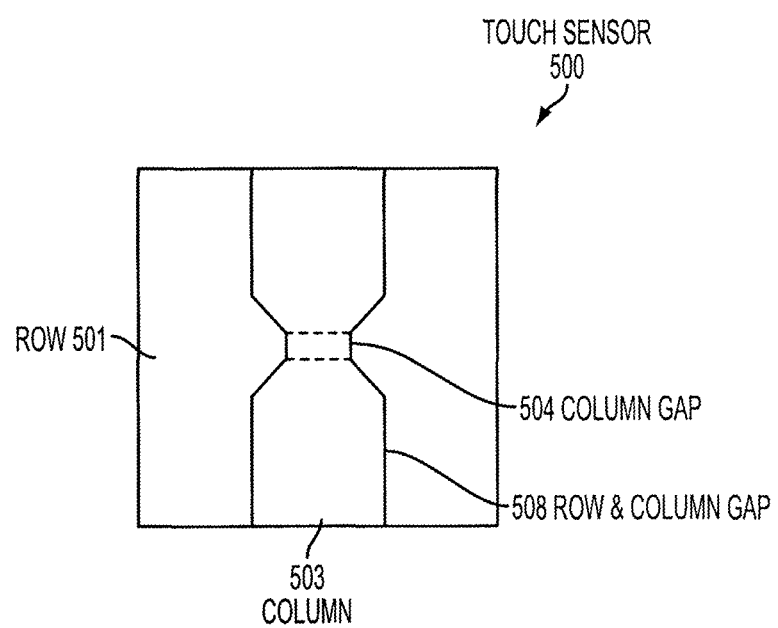

FIGS. 5a through 5d illustrate an exemplary touch sensor panel fabricated using the method of FIG. 4. In the example of FIG. 5a, touch sensor 500 of a touch sensor panel can include first conductive layer 536 deposited onto a cover substrate (not shown), where the conductive layer can be ablated to define a portion of a row. A pair of small horizontal row gaps 502 can form the narrowing portion of the row to cross over with the to-be-defined column in the second conductive layer. A longer horizontal row gap (not shown) made during the ablation can separate the row from an adjacent row. In the example of FIG. 5b, dielectric layer 566 can be deposited onto the first conductive layer 536 to cover the ablated pattern. The first conductive layer 536 being underneath the dielectric layer 566 is symbolically illustrated by the dashed lines of the row gap 502. In the example of FIG. 5c, second conductive layer 596 can be deposited onto the dielectric layer 566 to cover the dielectric layer. The first conductive layer 536, the dielectric layer 566, and the second conductive layer 596 can be ablated together to complete the row in the first conductive layer and to define a portion of a column in the second conductive layer. The row and column gaps 508 can connect with the previously-made row gaps 502 in the first conductive layer 536 to separate and electrically isolate the row from a dummy region. In the example of FIG. 5d, the second conductive layer 596 can be ablated to complete the column in the conductive layer. A pair of vertical column gaps 504 can form the narrowing portion of the column to cross over the underlying row's narrowing portion. The column gaps 504 can connect with the previously-made row and column gaps 508 in the second conductive layer 596 to separate and electrically isolate the column from a dummy region. A vertical column gap (not shown) can optionally be made during ablation between adjacent columns. Because all the layers are ablated together, the row in the first conductive layer can align with the dummy region in the second conductive layer and the column in the second conductive layer can align with the dummy region in the first conductive layer.

Figure 6:
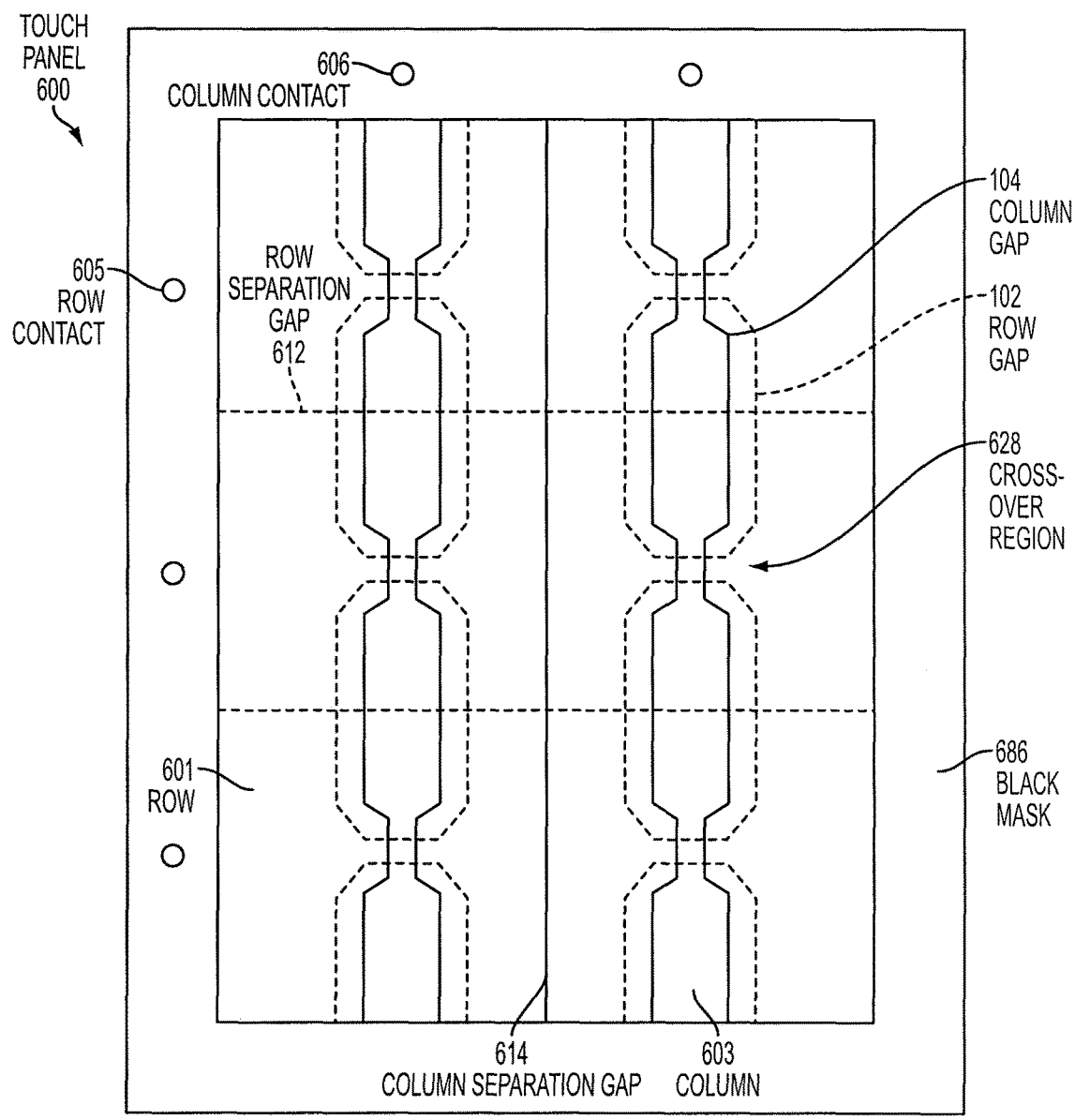
FIG. 6 illustrates another exemplary touch sensor panel fabricated using laser ablation according to various embodiments.

FIG. 6 illustrates another exemplary touch sensor panel fabricated using laser ablation according to various embodiments. The touch sensor panel of FIG. 6 can be the same as the touch sensor panel of FIGS. 1a through 1d with the following addition. In the example of FIG. 6, black mask 686 can be formed around the boundary of touch sensor panel 600 to form an aesthetic barrier. An opaque dielectric material forming the black mask can be printed around the boundary of the second conductive layer with a print device utilizing ink jet printing, screen printing, or other suitable printing techniques.

In some alternate embodiments, the black mask can be printed around the boundary of the cover substrate on the substrate's undersurface before the first conductive layer is deposited.

Figure 7:
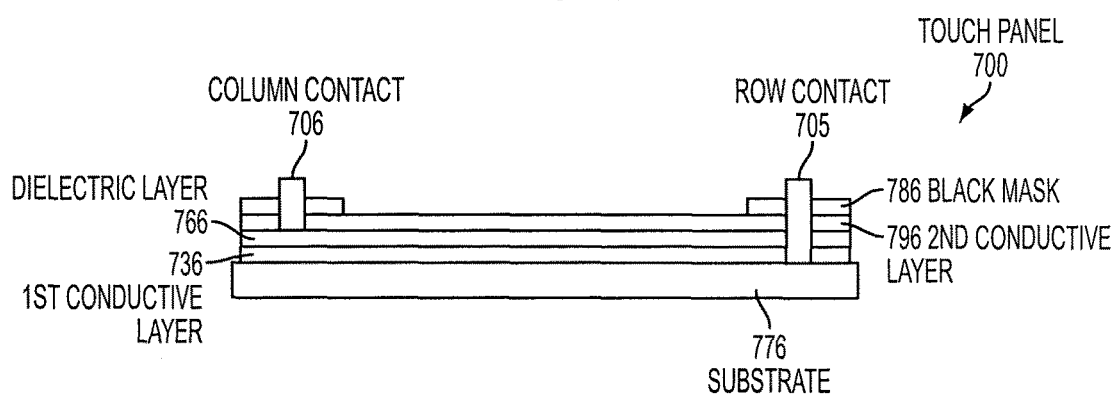
FIG. 7 illustrates a cross-sectional view of another exemplary touch sensor panel fabricated using laser ablation according to various embodiments.

FIG. 7 illustrates a cross-sectional view of the touch sensor panel of FIG. 6. After black mask 786 has been printed onto second conductive layer 796, conductive carbon ink can be printed onto the second conductive layer to form column contact 706 with the second conductive layer. Silver ink can be printed onto the carbon ink to form traces for routing electrical signals between the column contact 706 and touch circuitry (not shown). Similarly, conductive carbon ink can be printed into openings in the second conductive layer 796 and dielectric layer 766 to form row contact 705 with first conductive layer 736. Silver ink can be printed onto the carbon ink to form traces for routing electrical signals between the row contact 705 and touch circuitry (not shown). Other conductive inks and/or materials can be used according to various embodiments.

Figure 8:
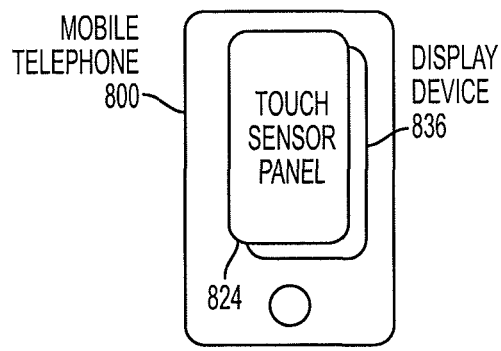
FIG. 8 illustrates an exemplary mobile telephone having a touch sensor panel fabricated using laser ablation according to various embodiments.

FIG. 8 illustrates an exemplary mobile telephone 800 that can include a display 836 and a touch sensor panel 824 fabricated using laser ablation according to various embodiments.

Figure 9:
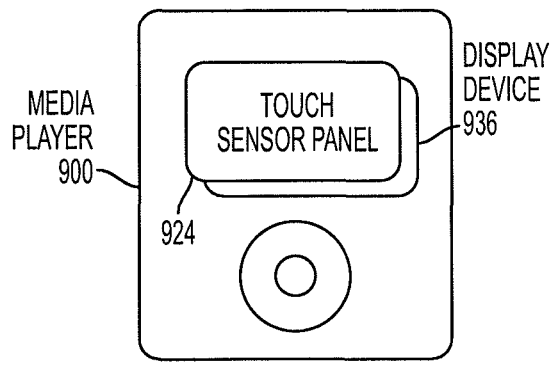
FIG. 9 illustrates an exemplary digital media player having a touch sensor panel fabricated using laser ablation according to various embodiments.

FIG. 9 illustrates an exemplary digital media player 900 that can include a display 936 and a touch sensor panel 924 fabricated using laser ablation according to various embodiments.

Figure 10:
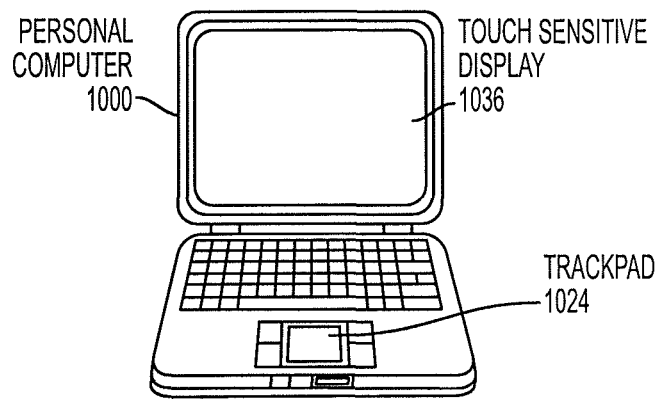
FIG. 10 illustrates an exemplary personal computer having a touch sensitive display and a touchpad fabricated using laser ablation according to various embodiments.

FIG. 10 illustrates an exemplary personal computer 1000 that can include a touch sensitive display 1036 and a touch sensor panel (trackpad) 1024, where the touch sensitive display and the trackpad can be fabricated using laser ablation according to various embodiments.

The mobile telephone, media player, and personal computer of FIGS. 8 through 10 can be thinner and can avoid some visual artifacts by utilizing a touch sensor panel fabricated according to various embodiments.

Although embodiments describe touch sensors, it is to be understood that proximity and other types of sensors can also be used.

Although embodiments describe the touch sensors being formed on a single side of a strengthened, formed cover substrate, it is to be understood that the touch sensors or portions thereof can be formed on multiple sides of the cover substrate or some other suitable substrate ready for use in a touch sensor panel.

Although embodiments have been fully described with reference to the accompanying drawings, it is to be noted that various changes and modifications will become apparent to those skilled in the art. Such changes and modifications are to be understood as being included within the scope of the various embodiments as defined by the appended claims.

What is claimed is:

1. A method comprising:
ablating a first conductive layer to define first portions of touch sensors and a first plurality of dummy regions, the first portions connected by multiple crossover regions, wherein each dummy region of the first plurality of dummy regions is formed entirely by portions of the first conductive layer, and wherein each dummy region of the first plurality of dummy regions is electrically isolated from the first portions of touch sensors;
after ablating the first conductive layer, depositing a dielectric layer onto the first conductive layer, wherein the first portions of touch sensors and the first plurality of dummy regions are completely covered by the dielectric layer; and
after depositing the dielectric layer onto the first conductive layer, ablating a second conductive layer proximate to the first conductive layer to define second portions of the touch sensors and a second plurality of dummy regions, the second portions connected by multiple crossover regions, wherein each dummy region of the second plurality of dummy regions is formed entirely by portions of the second conductive layer, wherein each dummy region of the second plurality of dummy regions is electrically isolated from the second portions of touch sensors, wherein the first and second portions cross over at the respective crossover regions, wherein the first portions of touch sensors and the second plurality of dummy regions overlap, and wherein the second portions of touch sensors and the first plurality of dummy regions overlap.

2. The method of claim 1, wherein ablating the first conductive layer comprises defining either drive lines or sense lines of the touch sensors.

3. The method of claim 1, wherein ablating the second conductive layer comprises defining either drive lines or sense lines of the touch sensors.

4. The method of claim 1, wherein ablating the first conductive layer comprises separating the first conductive layer into electrically connected regions and electrically disconnected regions, the electrically connected regions comprising the first portions of the touch sensors.

5. The method of claim 1, wherein ablating the second conductive layer comprises separating the second conductive layer into electrically connected regions and electrically disconnected regions, the electrically connected regions comprising the second portions of the touch sensors.

6. The method of claim 1, comprising depositing a mask around a boundary of at least one of the first and second conductive layers.

7. The method of claim 1, comprising forming a first set of contacts on the first portions of the touch sensors and a second set of contacts on the second portions of the touch sensors to electrically contact touch circuitry.

8. The method of claim 1, wherein the crossover regions are narrower than the first and second portions to reduce unwanted capacitive coupling between the first and second portions.

9. A method comprising:
depositing a first conductive layer onto a substrate;
laser ablating the first conductive layer to create gaps in the first conductive layer that divide the first conductive layer into a first touch sensing pattern and a first plurality of dummy regions, wherein each dummy region of the first plurality of dummy regions is formed entirely by portions of the first conductive layer, and wherein each dummy region of the first plurality of dummy regions is electrically isolated from the first touch sensing pattern;
depositing a dielectric layer onto the first conductive layer, wherein the first touch sensing pattern and the first plurality of dummy regions are covered by the dielectric layer;
depositing a second conductive layer onto the dielectric layer; and
laser ablating the second conductive layer to create gaps in the second conductive layer that divide the second conductive layer into a second touch sensing pattern and a second plurality of dummy regions, wherein each dummy region of the second plurality of dummy regions is formed entirely by portions of the second conductive layer, wherein each dummy region of the second plurality of dummy regions is electrically isolated from the second touch sensing pattern, wherein the first plurality of dummy regions at least partially overlap the second touch sensing pattern, and wherein the second plurality of dummy regions at least partially overlap the first touch sensing pattern.

10. The method defined in claim 9, wherein laser ablating the first conductive layer comprises removing strips of the first conductive layer, and wherein laser ablating the second conductive layer comprises removing strips of the second conductive layer.

* * * * *